ary Examiner—Robert L. Griffin
United States Patent [19]
Thompson

[11] Patent Number: 4,472,816
[45] Date of Patent: Sep. 18, 1984

[54] FSK DISCRIMINATOR

[75] Inventor: James E. Thompson, Scottsdale, Ariz.

[73] Assignee: Gen Rad, Inc., Concord, Mass.

[21] Appl. No.: 418,580

[22] Filed: Sep. 15, 1982

[51] Int. Cl.³ .......................................... H04L 27/14
[52] U.S. Cl. ...................................... 375/80; 375/88; 329/104
[58] Field of Search ................. 375/9, 80, 82, 88, 103, 375/104; 329/104, 110, 137, 140; 328/109, 140, 141; 307/522, 524; 179/2 DP

[56] References Cited
U.S. PATENT DOCUMENTS 3,739,288  6/1973  Coccagna ............................ 329/104
3,778,727  12/1973  Williams ............................. 329/104

Primary Examiner—Robert L. Griffin
Assistant Examiner—Albert W. Watkins
Attorney, Agent, or Firm—Cahill, Sutton & Thomas

[57] ABSTRACT

An FM discriminator useful in a modem circuit includes a tank circuit coupled to an input receiving an FSK input signal. The FSK input signal is resistively coupled to an input of an operational amplifier having its output also coupled to that input. The other input of the operational amplifier is connected to the tank circuit and to an input of a comparator. The other input of the comparator is connected to the output of a circuit which produces a signal that lags by 90 degrees the signal produced by the tank circuit. The output of the comparator is used to synchronously chop the output signal of the first operational amplifier in such a way as to pass the operational amplifier output signal when the comparator output signal is a "1" and to invert the operational amplifier output signal when the comparator output signal is a "0". The tank circuit resonates at a frequency between the "0" and "1" frequencies of the FSK signal and, in combination with the operational amplifier, causes attenuation of components of the FSK input signal which are at the resonant frequency.

16 Claims, 5 Drawing Figures

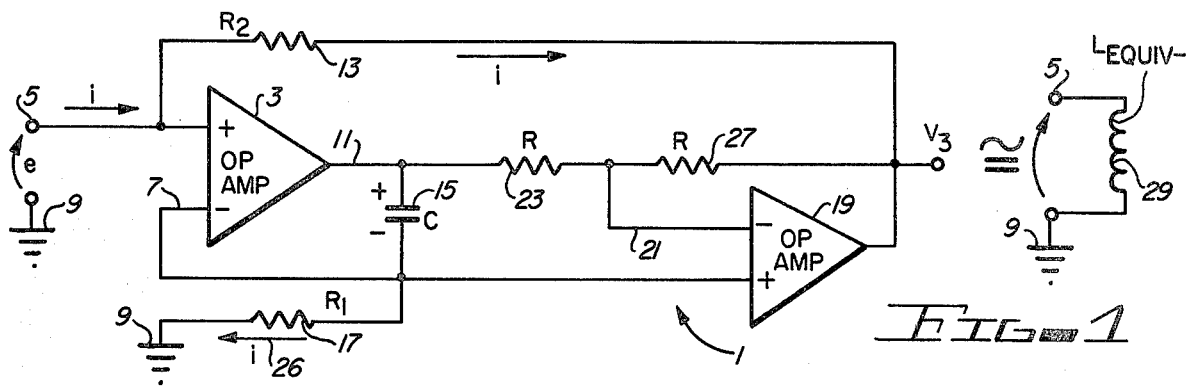
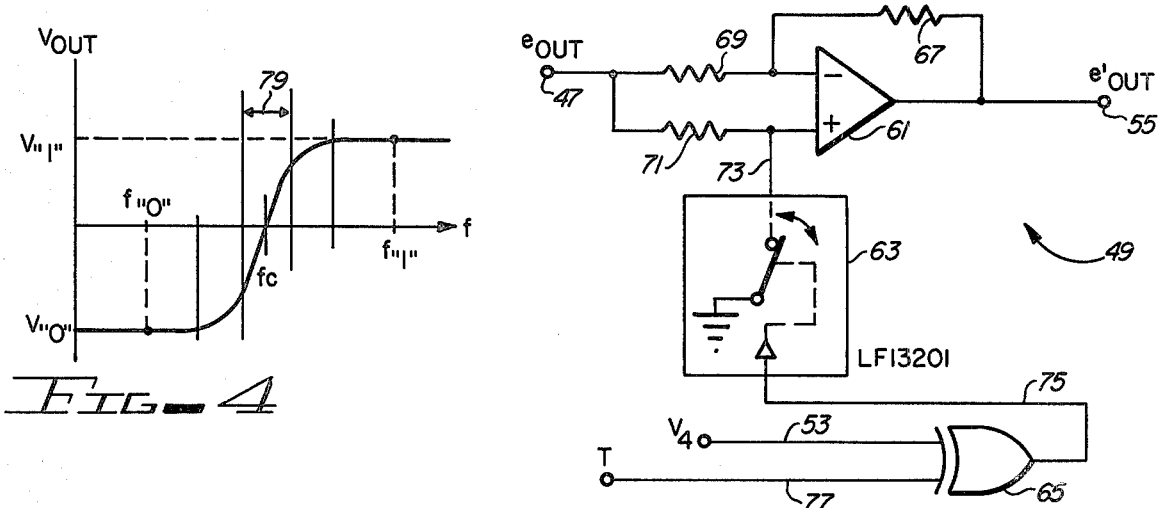
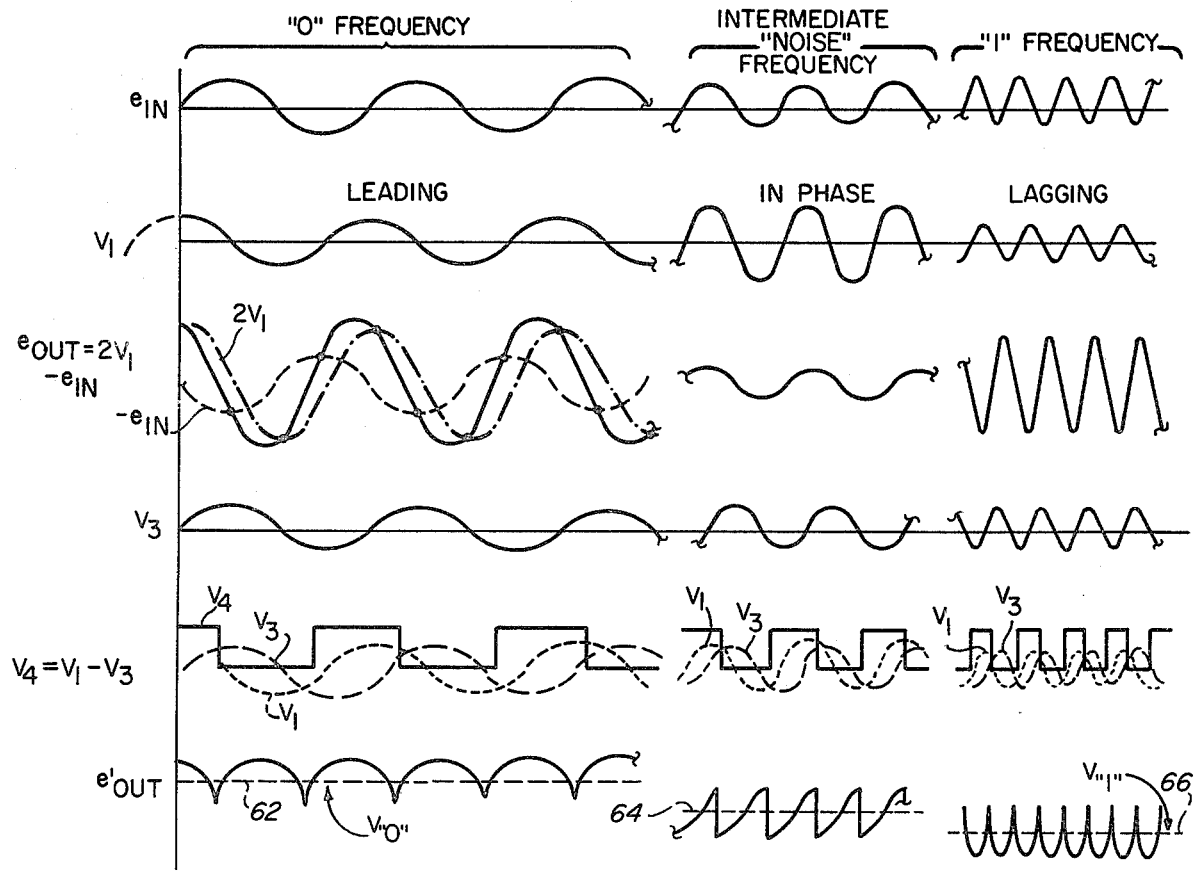

FSK DISCRIMINATOR

BACKGROUND OF THE INVENTION

The invention relates to circuits and methods for FM signal discrimination, particularly for discriminating FSK (frequency shift keyed) signals in modem receivers.

Modems are commonly used to allow reliable communication of digital data over telephone lines. FSK techniques are used, wherein two separate frequencies, a low frequency (for example, 1070 Hz) and a high frequency (for example 1270 Hz) are used to represent two logic levels, respectively.

Acoustic couplers are commonly used in conjunction with modems to couple a computing system to an ordinary telephone. Telephone microphones usually are carbon microphones, and they are known to produce a substantial amount of harmonic distortion. The modem communication frequencies (which are chosen by the telephone company) and the harmonic distortion frequencies produced by carbon microphones in ordinary telephones are such that the harmonic distortion produced by acoustic coupling of digital data to the telephone line can fall within the same band as the two FSK signal frequencies representing digital data. The FSK receiver of the modem often has difficulty discriminating the two meaningful predetermined FSK signal frequencies from the accompanying harmonic distortion frequencies produced as a result of non-linearities in the above-mentioned carbon microphones.

Usually "digital" discriminating techniques have been used to perform the function of distinguishing the two desired FSK signal frequencies from the undesired harmonic distortion frequencies which lie therebetween. Unfortunately, the known digital FM discriminating techniques all perform their function by "looking" at zero crossings of the signal to be discriminated. Consequently, "jitter" of the zero crossing points caused by the above-mentioned harmonic distortion often results in discriminating errors. To avoid such errors, it has been necessary for prior art discriminating circuits to test at least a few successive zero crossing points to be sure they are all in the same frequency range before a decision is made as to whether the signal frequency represents a "1" or a "0". This requirement leads to increased circuit cost and complexity and decreased circuit speed. This is highly inconsistent with the growing need for higher speed, lower cost digital communication via telephone systems.

Thus, there remains an unmet need for a system for avoiding data errors caused in FSK receivers by harmonic distortion produced by telephone carbon microphones operating in conjunction with acoustic couplers coupled to the modem receivers. More specifically, there remains an unmet need for a system for economically and accurately discriminating between two closely spaced FM signals of predetermined frequencies despite the presence of noise signals having frequencies that lie between the two predetermined frequencies.

Therefore, it is an object of the invention to provide an apparatus and method for accurately and economically discriminating between first and second FM signals having different first and second predetermined frequencies, respectively, despite the presence of noise signals with frequencies between the first and second predetermined frequencies.

It is another object of the invention to economically avoid the errors caused in prior FSK receivers by harmonic distortion signals produced as a result of non-linearities in telephone carbon microphones.

SUMMARY OF THE INVENTION

Briefly described, and in accordance with one embodiment thereof, the invention provides an improved method and apparatus for discriminating between first and second spaced frequences of a first signal, which can be an FSK signal, by coupling a portion of the first signal to a tank circuit, by coupling the first signal to a circuit which produces a second signal that leads the first signal if the first signal is at the first frequency and lags the first signal if the first signal is at the second frequency, by using the second signal to generate a chopping signal which lags the second signal by a predetermined amount, and by synchronously chopping the second signal to produce an output signal that has positive average value, a negative average value, and a zero average value when said first signal is at the first frequency, the second frequency, and the resonant frequency of the tank circuit, respectively.

In the described embodiment of the invention, the tank circuit is composed of a first capacitor and an inductive circuit which is composed of two operational amplifiers and a second capacitor. The inductive circuit produces an output signal that lags the input thereof by ninety degrees. The input of the inductive circuit is connected to the resonant voltage node of the tank circuit. In the described embodiment of the invention, the first signal is an FSK signal, a portion of which is coupled to the resonant node of the tank circuit. The resonant node of the tank circuit is also connected to the positive input of an operational amplifier. The input signal is resistively coupled to the negative input of the operational amplifier, which produces the second signal. The tank circuit and the operational amplifier combine to function as a notch filter for the FSK signal in order to eliminate undesired components thereof near the resonant frequency (which is between the first and second frequencies). The chopping signal and the second signal are applied to inputs of a switching circuit that produces the output signal by, in essence, passing the second signal when the chopping signal is at a first level and producing the negative of the second signal when the chopping signal is at a second level.

BRIEF DESCRIPTION OF THE DRAWINGS

FIG. 1 is a schematic circuit drawing illustrating a circuit that simulates an inductor and is used in the described embodiment of the invention.

FIG. 3 is a diagram illustrating a number of waveforms that are useful in explaining the operation of the circuit of FIG. 2.

FIG. 4 is an "S" curve useful in explaining the operation of the circuit of FIG. 2.

FIG. 5 is a circuit schematic drawing of a switching circuit utilized in the circuit of FIG. 2.

DESCRIPTION OF THE INVENTION

Figure 2:
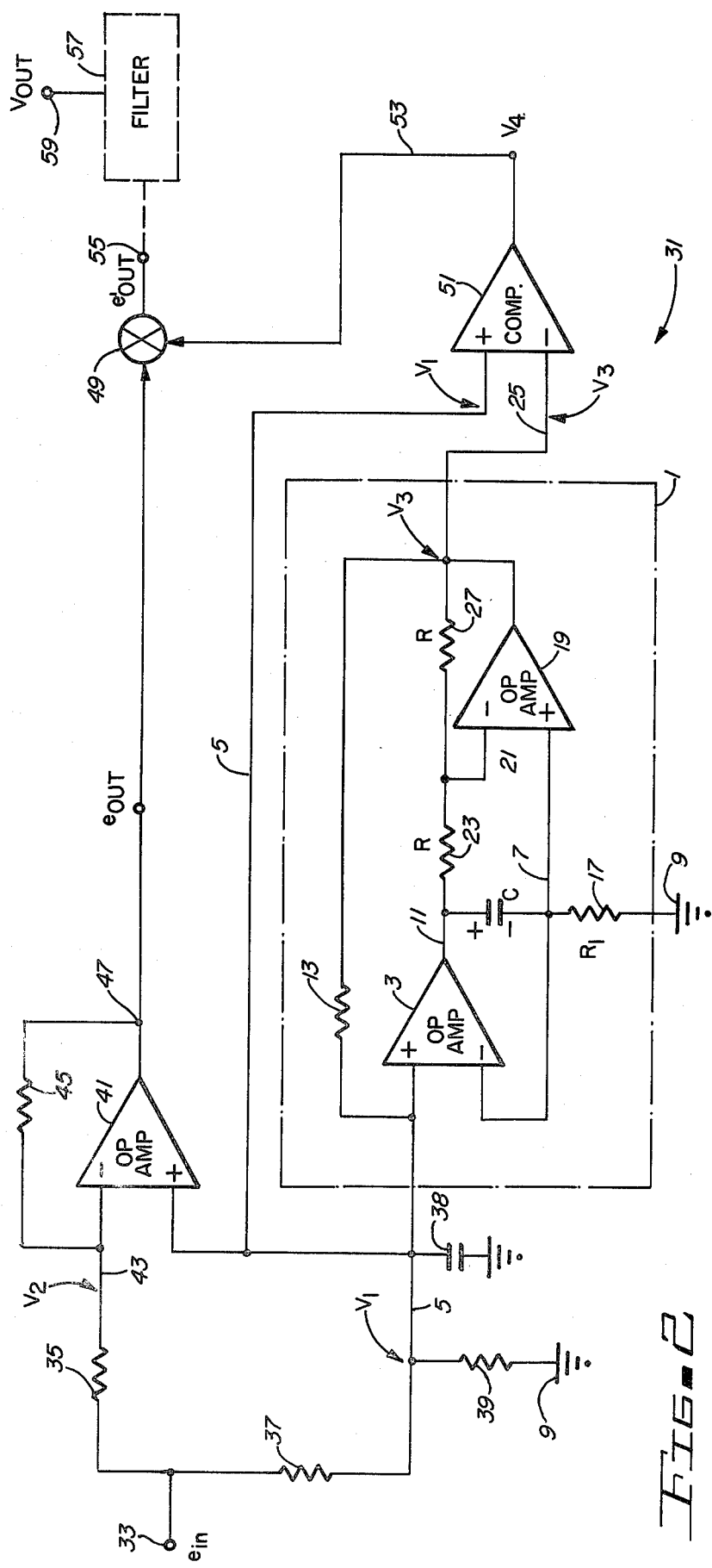
FIG. 2 is a circuit schematic drawing illustrating the described embodiment of the invention.

Referring first to FIG. 2, discriminator circuit 31 includes a circuit 1 that functions precisely as a high "Q" inductor connected between conductor 5 and ground conductor 9. A capacitor 38 is connected in parallel with inductive circuit 1. An input conductor 33, to which an FSK signal $e_{in}$ is applied, is coupled by means of resistor 37 to conductor 5, producing a voltage V1 thereon. A resistor 39 is coupled in parallel with capacitor 38 and inductive circuit 1.

Conductor 33 is coupled by means of resistor 35 to conductor 43, which has a voltage V2 thereon. Conductor 43 is connected to the negative input of an operational amplifier 41, which can be implemented by means of a TLO84 manufactured by Texas Instruments. The output of operational amplifier 41 is connected to conductor 47, and produces a signal $e_{out}$. Conductor 47 is coupled by means of feedback resistor 45 back to conductor 43.

The voltage V1 is coupled by means of conductor 5 to the positive input of operational amplifier 41, and is also coupled by means of conductor 5 to the positive input of a comparator 51, which is implemented by means of a LM339 manufactured by National Semiconductor, Inc.

As subsequently explained with reference to FIG. 1, inductive circuit 1 has an output connected to conductor 25, on which a voltage V3 is produced. The voltage V3 lags the voltage V1 by 90°. The voltage V3 is connected to the negative input of comparator 51. The output of comparator 51 is connected to conductor 53, on which a voltage V4 is produced. Conductor 53 is connected to an input of a switching circuit 49, which is shown in detail in FIG. 5. The signal $e_{out}$ on conductor 47 is connected to another input of switching circuit 49. The output of switching circuit 49 is connected to conductor 55, on which a signal $e'_{out}$ is produced. As subsequently explained in more detail, the signal V4 synchronously "chops" the signal $e_{out}$ such that $e'_{out}$ is equal to $e_{out}$ when V4 is a logical "0".

The signal $e'_{out}$ is applied to a filter circuit 57 which produces a filtered DC output signal level $V_{out}$ on conductor 59.

Before describing the operation of the discriminator circuit 31 of FIG. 2, it will be helpful to first describe the structure and operation of inductive circuit 1, which is shown in FIG. 1. Referring now to FIG. 1, inductive circuit 1 includes an operational amplifier 3 having a positive input connected to conductor 5. The negative input of operational amplifier 3 is connected to conductor 7. Conductor 7 is coupled by means of resistor 17 to ground conductor 9. The output 11 of operational amplifier 3 is connected by means of capacitor 15 to conductor 7. Conductor 11 is also connected by means of resistor 23 to the negative input of operational amplifier 19. The output of operational amplifier 19 is connected to conductor 25, which is coupled by means of resistor 27 back to conductor 21, which is connected to the negative input of operational amplifier 19. Conductor 25 is also connected by means of resistor 13 to conductor 5. The positive input of operational amplifier 19 is connected to conductor 7.

Operational amplifiers 3 and 19 can be implemented by means of Texas Instruments TLO84 integrated circuit operational amplifiers. As indicated in FIG. 1, the inductive circuit 1 has the characteristics of an inductor 29 having the value $L_{equiv}$. The value of the equivalent inductance $L_{equiv}$ is given by the expression $$L_{equiv.} = R1 \cdot R2 \cdot C,$$

where R1 is the resistance of resistor 17, R2 is the resistance of resistor 13, and C is the capacitance of capacitor 15.

That this is true can be shown by the following analysis. First, operational amplifier 3 operates in a manner well known to those skilled in the art to maintain the voltage on conductor 7 equal to the voltage e applied to input conductor 5. This causes a current indicated by arrow 26 and equal to e/R1 to flow through resistor 17. Since, by definition, no appreciable current can flow into either the negative input of operational amplifier 3 or the positive input of operational amplifier 19, the entire current e/R1 must flow through capacitor 15, which has a capacitance C. This causes a voltage e/(R1·C·S) to be developed across capacitor 15, with the polarity indicated by the plus sign and the minus sign shown adjacent to capacitor 15 in FIG. 1, wherein 1/(C·s) is the impedance of capacitor 15. Thus, it can be seen easily that the voltage of conductor 11 is the sum of e (the voltage on conductor 7) and e/(R1·C·s); i.e., that the voltage of conductor 11 is $$e \cdot \left(1 + \frac{1}{R1 \cdot C \cdot s}\right);$$

Furthermore, since operational amplifier 19 operates to keep its positive and negative inputs at the same voltages, i.e., at e volts, the voltage across resistor 23 is $$e \cdot \left(1 + \frac{1}{R1 \cdot C \cdot s}\right) - e;$$

i.e., the voltage across resistor 23 is equal to e/(R1·C·s). Since, as those skilled in the art will readily observe, no appreciable current can flow into the negative input of operational amplifier 19, and since it is assumed that resistors 23 and 27 are equal, then resistors 23 and 27 must have equal voltage drops across them. Therefore, the voltage of conductor 25 must be $$e \cdot \left(1 - \frac{1}{R1 \cdot C \cdot s}\right).$$

Thus, it can be seen that the voltage across resistor 13 is $$e - e \left(1 - \frac{1}{R1 \cdot C \cdot s}\right)$$

i.e., the voltage across resistor 13 is equal to e/(R1·C·s), where R1 is the resistance of resistor 13. Therefore, the current through resistor 15 is e/(R1·R2·C·s). The impedance of the entire circuit 1 therefore is e/i=R1·R2·C·s, which is the impedance of an equivalent inductor having an inductance $$L_{equiv.} = R1 \cdot R2 \cdot C$$

Of considerable importance to the present invention is the fact that the voltage V3 on conductor 25 is in phase with the voltage on conductor 11 which, as explained above, lags the input voltage e by ninety degrees. As subsequently explained, this voltage V3 is used to synchronously strobe the signal $e_{out}$ produced on conductor 47 by operational amplifier 41 of FIG. 2 in order to produce the desired "S" curve characteristic shown in FIG. 4.

Referring now to FIG. 5, the circuit used for implementing switching circuit 49 in FIG. 2 is illustrated. Switching circuit 49 includes an operational amplifier 61, which can be implemented by means of a Texas Instruments TLO84 integrated circuit. Its negative input is coupled by means of resistor 69 to the $e_{out}$ signal on conductor 47. The negative input of operational amplifier 61 is connected to the output 55 of operational amplifier 61 by means of resistor 67. The positive input of operational amplifier 61 is coupled by means of resistor 71 to conductor 47. The positive input of operational amplifier 61 is also connected by conductor 73 to an output of a LF13201 analog FET (field effect transistor) switch 63 manufactured by National Semiconductor. An input of analog switch circuit 63 is connected to conductor 75. Conductor 75 is connected to the output of an exclusive OR circuit 65, one input of which is connected to conductor 53, on which the voltage V4 is produced. The other input of exclusive OR circuit 65 is connected to conductor 77 on which a signal T is applied. The level of the signal T controls whether the higher frequency is interpreted as a "1" (as is the convention in the United States) or as a "0" (as is the convention in Europe).

The analog FET circuit 63 includes a FET switch that grounds the positive input of operational amplifier 61 when a logical "0" is produced on conductor 53 by the output of comparator 51 (FIG. 2). In this event, it can be seen that operational amplifier 61 will function to cause its negative input also to be grounded. This will cause a current $e_{out}/R$ to flow through resistor 69, where R is the resistance of resistor 69. If it is assumed that resistor 67 also has a resistance R, then, since the same current must flow through resistor 67, operational amplifier 61 will cause $e'_{out}$ to be equal to $-e_{out}$ in order to make that same current flow through resistor 67.

However, if the relay in analog FET switch circuit 63 is open, there will be no current across resistor 71, and both the positive and negative inputs of operational amplifier 61 will be at $e_{out}$. The current flowing through resistor 69 and 67 also will be zero, therefore $e'_{out}$ will be equal to $e_{out}$.

Exemplary values for the various elements shown in FIGS. 1, 2 and 5 are given in the following Table.

| ELEMENT | VALUE |
| --- | --- |
| R | 10 KΩ |
| R1 | 4–34 KΩ |
| R2 | 10 KΩ |
| RA | 100 KΩ |
| 15 | .01 μf |
| 38 | .01 μf |
| 67 | 10 KΩ |
| 69 | 10 KΩ |
| 71 | 10 KΩ |

The inductive circuit of FIG. 1 is a circuit that I invented a number of years ago. I have used it in several integrated circuits that I have designed. These integrated circuits have been manufactured and sold by several companies, but the circuit design has never been published and very few people even know of the existence of the inductive circuit shown in FIG. 1.

It is very convenient to use the inductive circuit of FIG. 1 in the tank circuit of FIG. 2, not only because the inductive circuit 1 accurately functions as a high Q inductance that can be implemented in an integrated circuit, but also because inductive circuit 1 inherently produces the signal V3, which lags its input voltage e (FIG. 1) by 90°.

Now that the structure of the discriminator circuit 31 of FIG. 2 has been explained and the basic operation of the inductive circuit 1 is understood, the operation of the discriminator circuit 31 will be explained with reference to the waveforms shown in FIG. 3.

Note that the $e_{in}$ waveform shown in FIG. 3 is the waveform of the FSK voltage signal $e_{in}$ applied to conductor 33 in FIG. 2. Also note that the $e_{in}$ waveform is split into three portions, the left portion representing a "low" frequency (for example 1070 Hz) of the above-mentioned FSK signal and corresponding to a logic level that is referred to for convenience as a "0" level.

The middle portion of the $e_{in}$ waveform in FIG. 3 represents a "center frequency" at which the tank circuit, including capacitor 38 and inductive circuit 1, resonates; the middle portion of the $e_{in}$ waveform also represents the above-mentioned undesired harmonic distortion signal that causes errors in known prior art digital FSK discriminators of the type which detect zero crossings of the FSK signal in order to discriminate between the predetermined "high" frequency and the predetermined "low" frequency of an FSK signal.

The right hand portion of the $e_{in}$ waveform of FIG. 3 represents the "high" frequency (for example 1270 Hz) of the FSK signal and corresponds to a logic level that, for convenience, will be referred to as a "1" level. It is to be understood that the "center" frequency lies approximately midway between the "low" frequency and the "high" frequency of the FSK signals $e_{in}$.

The received FSK signal is applied by means of resistor 35 to the negative input of operational amplifier 41 and by means of resistor 37 to resonant node conductor 5 of the above-mentioned tank circuit. For the purpose of the immediately following discussion, assume that the "low" frequency of $e_{in}$ is being applied to conductor 33. Since this "low" frequency is less than the resonance frequency of the tank circuit, the voltage V1 on conductor 5 leads $e_{in}$, because at the "low" frequency the tank circuit appears inductive. The left portion of the V1 waveform in FIG. 3 clearly illustrates that V1 is leading $e_{in}$. The left portion of the V3 waveform lags V1 by ninety degrees, as previously explained. The left portion of the V4 waveform shows how comparator 51 detects the points at which V1 exceeds V3 and produces a "chopping" pulse during the time that V1 exceeds V3. It will be appreciated that the phases of V1 and V3 change relative to the phase of $e_{in}$ as the frequency of $e_{in}$ changes, since the reactance of the tank circuit varies as a function of frequency.

Next, note again that V1, the signal of the tank circuit, is applied to the positive input of operational amplifier 41. The operation of operational amplifier 41, of course, ensures that the magnitude of V2 is equal to the magnitude of V1, but since V2 is in phase with $e_{in}$ and V1 is out of phase with $e_{in}$ except at the resonant frequency of the tank circuit, V1 is out of phase with V2 except at the resonant or "center" frequency.

Next, it is noted that the voltage $e_{out}$ produced on conductor 47 by operational amplifier 41 is given by the expression $$e_{out} = 2V1 - e_{in}$$

if resistors 35 and 45 are equal. That this is true can be determined by noting that V2 is necessarily equal to V1 and that the same current must flow through each of resistors 35 and 45. Therefore, the voltages across resistors 35 and 45 are equal. Thus, $$e_{in} - V1 = V1 - e_{out},$$

and therefore $$e_{out} = 2V1 - e_{in}.$$

Since V1 is out of phase with $e_{in}$ (except at the center frequency), $e_{out}$ also is out of phase with $e_{in}$. This is shown by the left portion of the $e_{out}$ waveform in FIG. 3, wherein it can be seen that $e_{out}$ leads $e_{in}$ by nearly as much as V1 does.

By comparing the phase of the left portion of the V4 "chopping" waveform with the left portion of the $e_{out}$ waveform in FIG. 3, it is seen that the V4 waveform can be used to synchronously "chop" $e_{out}$ by means of the above-described switching circuit 49. The result of this synchronous chopping produces the left portion of the $e'_{out}$ waveform shown in FIG. 3. This portion of the $e'_{out}$ waveform has an average value of v"0" as indicated by the dotted line 62 in FIG. 3. This average value is produced on conductor 59 of FIG. 2 by filter circuit 57. Thus, the low frequency portion of the FSK signal $e_{in}$ has been converted to a DC level V"0" which is the desired result.

Next, consider the operation of the discriminator circuit 31 in response to the "middle" portion of the received FSK signal $e_{in}$ shown in FIG. 3. The tank circuit is resonant at the frequency of $e_{in}$, so V1 is in phase with $e_{in}$, as shown. Those skilled in the art will recognize that the amplitude of V1 peaks at the resonant frequency, and therefore, in accordance with expression (1) above, $e_{out}$ will have a minimum magnitude at this resonant frequency. Thus, it can be seen that while the tank circuit functions as a band pass filter, the tank circuit connected to operational amplifier 41 as shown in FIG. 2 constitutes a circuit that functions as a notch filter.

The minimum magnitude of $e_{out}$ at the center frequency is illustrated as indicated in FIG. 2 by showing the magnitude of the center portion of $e_{out}$ substantially less than the lower frequency left band portion and the higher frequency right band portion thereof.

By comparing the phase of the chopping pulses of the center portion of the V4 waveform with the phase of the center portion of the $e_{out}$ waveform, it is seen that the chopping pulses are now in such a phase relationship with $e_{out}$ that switching circuit 49 causes the center portion of the $e'_{out}$ waveform to appear as shown in FIG. 3 when the $e_{in}$ is near or at the center frequency. At the center frequency, the average value of the center portion of $e'_{out}$ is approximately zero, as indicated by dotted line 64.

Thus, it is seen that the previously described undesired harmonic frequencies that are located toward the center of the band between the predetermined "low" and "high" frequencies of the FSK signal $e_{in}$ are attenuated (by the notch filter portion of discriminator circuit 31). Furthermore, the portion of such undesired harmonic frequencies not attenuated are "averaged" out by the above described synchronous "chopping" technique and the action of filter 57.

Finally, the response of discriminator 31 to the "high" frequency portion of the received FSK signal $e_{in}$, shown in FIG. 3 in the right hand portion of the $e_{in}$ waveform now can be described. At this high frequency, the reactance of the tank circuit is essentially capacitive, and therefore the voltage V1 lags $e_{in}$. Therefore, $e_{out}$ also lags $e_{in}$, as does V3; hence V4 also lags $e_{in}$.

The synchronous chopping of $e_{out}$ by V4 at this high frequency by means of switching circuit 49 produces the right hand portion of the $e'_{out}$ waveform shown in FIG. 3 in a manner entirely analogous to that already described with reference to the left hand portion of the waveforms shown in FIG. 3. Filter 57 then averages this right hand portion of the $e'_{out}$ waveform to produce a negative average value v"1" as indicated by dotted line 66.

It now can be seen that the discriminator circuit 2 operates to produce the "S" curve shown in FIG. 4, where $V_{out}$ is the DC voltage produced on conductor 59, and wherein the horizontal axis indicates the frequency f of the input signal $e_{in}$ applied to conductor 33. The above-mentioned "low" frequency of the FSK signal $e_{in}$ is designated by f"0" and the "high" frequency is designated by f"1". The center frequency referred to above is indicated in FIG. 4 by $f_c$. The average values designated by dotted lines 62 and 66 in FIG. 3 are indicated on the vertical axis in FIG. 4. Reference numeral 79 designates the range of undesired harmonic distortion noise frequencies that are effectively attenuated and ignored by discriminator 31.

While the invention has been described with reference to a particular embodiment thereof, those skilled in the art will be able to make various modifications to the disclosed apparatus and method without departing from the true spirit and scope of the present invention.

I claim:

1. A method for discriminating between first and second spaced frequencies of a first signal, said method comprising the steps of:
   (a) coupling a portion of the said first signal to a voltage conductor of a tank circuit which has a resonant frequency between said first and second frequencies in order to produce a second signal which leads said first signal if said first signal is at said first frequency and which lags said first signal if said first signal is at said second frequency;
   (b) coupling a portion of said first signal to a first input of a first circuit and also coupling said second signal to a second input of said first circuit during step (a) in order to produce a third signal which leads said first signal if said first signal is at said first frequency and which lags said first signal if said first signal is at said second frequency;
   (c) generating a fourth signal in response to said second signal, wherein said fourth signal lags said second signal by a predetermined phase angle; and
   (d) using said fourth signal to synchronously operate on said third signal to produce a fifth signal, said fifth signal having a first average amplitude of a first polarity when said first signal is at said first frequency, a second average amplitude of a second polarity when said first signal is at said second frequency, and an average amplitude of approximately zero when said first signal is at said center frequency.

2. The method of claim 1 wherein said first circuit includes a notch filter circuit that attenuates the amplitude of any components of said first signal having frequencies near said resonant frequency.

3. The method of claim 1 including the step of filtering said fifth signal to produce said first average amplitude at said first polarity, said second average amplitude at said second polarity, and said average amplitude of approximately zero.

4. The method of claim 1 including operating on a first capacitor and an inductive circuit that both functions as an inductor and generates a signal that lags a signal applied to an input of said inductive circuit in order to produce said second and third signals.

5. The method of claim 4 wherein step (b) includes resistively coupling said first signal to a first input of a first operational amplifier having its output resistively coupled to its first input and also includes coupling said second signal to a second input of said first operational amplifier.

6. The method of claim 5 wherein said using of said inductive circuit includes applying said second signal to a first input of a second operational amplifier, applying the output signal generated by the second operational amplifier to a second capacitor that is coupled between the output and a second input of said second operational amplifier, applying the voltage on said second input of said second operational amplifier to both a first resistor that is connected to a reference voltage conductor and a first input of a third operational amplifier, resistively coupling the output of said second operational amplifier to a second input of said third operational amplifier, resistively coupling the voltage on said second input of said third operational amplifier to an output of said third operational amplifier, and resistively coupling the voltage at the output of said third operational amplifier;

the voltage on the output of said third operational amplifier lagging said second signal by ninety degrees by virtue of a current flowing through said first resistor, thereby causing the voltage across said first capacitor to be ninety degrees out of phase with said second signal.

7. The method of claim 6 wherein said step (c) includes applying said third signal to a first input of a comparator circuit and applying said second signal to a second input of said comparator circuit to produce said fourth signal.

8. The method of claim 7 wherein:
said first input of said first operational amplifier is its negative input and said second input of said first operational amplifier is its positive input;
said first input of said second operational amplifier is its positive input and said second input of said second operational amplifier is its negative input; and
said first input of said third operational amplifier is its positive input and said second input of said third operational amplifier is its negative input.

9. The method of claim 7 wherein said fifth signal is substantially equal to said third signal while said fourth signal is at said first level, and wherein said fifth signal is substantially equal to the negative of said third signal while said fourth signal is at said second level.

10. A circuit for discriminating between first and second spaced frequencies of a first signal, said circuit comprising in combination:
(a) first coupling means for coupling a first signal to a voltage conductor of a tank circuit which has a resonant frequency between said first and second frequencies in order to produce a second signal on said voltage conductor, which second signal leads said first signal if said first signal is at said first frequency and lags said first signal if said first signal is at said second frequency;
(b) second coupling means for coupling said first signal to a first input of a first circuit and also coupling said second signal to a second input of said first circuit in order to produce a third signal which leads said first signal if said first signal is at said first frequency and lags said first signal if said first signal is at said second frequency;
(c) means for generating a fourth signal in response to said second signal, wherein said fourth signal lags said second signal by a predetermined phase angle; and
(d) means responsive to said fourth signal for synchronously operating on said third signal to produce a fifth signal which is proportional to said third signal while said fourth signal is at a first level and is substantially equal to minus a value that is proportional to said third signal while said fourth signal is at a second level, said fifth signal having a first average amplitude of a first polarity when said first signal is at said first frequency, a second average amplitude of a second polarity when said first signal is at said second frequency, and an average amplitude of approximately zero when said first signal is at said center frequency.

11. The circuit of claim 10 wherein said first coupling means includes a first resistor for coupling said first signal to said voltage conductor of said tank circuit and a second resistor coupling said voltage conductor of said tank circuit to a reference conductor.

12. The circuit of claim 11 wherein said first circuit includes a first operational amplifier and said second coupling means includes a third resistor for coupling said first signal to a first input of said first operational amplifier, said second coupling means also including a conductor for connecting said voltage conductor of said tank circuit to a second input of said first operational amplifier.

13. The circuit of claim 12 wherein said tank circuit includes a first capacitor and an inductive circuit, said inductive circuit including means for generating a sixth signal that lags said second signal by ninety degrees, and wherein said means for generating said fourth signal includes a comparator having a first input responsive to said second signal and a second input responsive to said sixth signal in order to produce said fourth signal.

14. The circuit of claim 13 wherein said means for producing said fifth signal includes a second operational amplifier and one input resistively coupled both to the output of said first operational amplifier and to the output of said second operational amplifier, said second operational amplifier having a second input resistively coupled to said output of said first operational amplifier and also coupled to means for applying a predetermined reference voltage to said second input of said second operational amplifier when said fourth signal is one of said first and second levels.

15. The circuit of claim 13 wherein said inductive circuit includes second and third operational amplifiers, wherein said voltage conductor of said inductive circuit is connected to a first input of said second operational amplifier, a fourth resistor coupling the output of said third operational amplifier to said first input of said second operational amplifier, a second input of said second operational amplifier being coupled to a first input of said third operational amplifier, a second capacitor being coupled between the output and second input of said second operational amplifier, a fifth resistor being coupled between said second input of said second operational amplifier and said reference conductor, a sixth resistor being coupled between the output of said second operational amplifier and a second input of said third operational amplifier and a second input of said third operational amplifier, and a seventh resistor being coupled between the output and second input of said third operational amplifier, said fourth signal being produced by the output of said third operational amplifier.

16. The circuit of claim 14 including filtering means responsive to the output of said second operational amplifier for producing said first average amplitude, said second average amplitude, and said zero average amplitude.

* * * * *